(12) United States Patent
Staubach et al.

(10) Patent No.: US 11,629,647 B2
(45) Date of Patent: Apr. 18, 2023

(54) SUPERCRITICAL $CO_2$ CYCLE AND INTEGRATED AUXILIARY POWER FOR GAS TURBINE ENGINES

(71) Applicant: United Technologies Corporation, Farmington, CT (US)

(72) Inventors: Joseph B. Staubach, Colchester, CT (US); Amanda J. L. Boucher, Boston, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 180 days.

(21) Appl. No.: 16/832,614

(22) Filed: Mar. 27, 2020

(65) Prior Publication Data

US 2021/0301729 A1    Sep. 30, 2021

(51) Int. Cl.
*F02C 7/32* (2006.01)
*F02C 7/141* (2006.01)

(52) U.S. Cl.
CPC .............. *F02C 7/32* (2013.01); *F02C 7/141* (2013.01); *F05D 2260/20* (2013.01)

(58) Field of Classification Search
CPC .... F02C 7/141; F02C 7/18; F02C 7/16; F02C 7/185; F02C 6/04; F02C 7/32; F05D 2260/20; B64D 2013/0611
See application file for complete search history.

(56) References Cited

U.S. PATENT DOCUMENTS

| | | | |
|---|---|---|---|
| 4,271,665 A * | 6/1981 | Mandrin | F01K 23/10 60/39.182 |
| 5,638,673 A * | 6/1997 | Yabe | F02C 1/00 60/649 |
| 7,748,211 B2 * | 7/2010 | Norris | F02C 7/224 60/39.38 |
| 9,222,480 B2 | 12/2015 | Younes et al. | |
| 9,318,625 B2 | 4/2016 | Gatzke | |
| 9,410,451 B2 * | 8/2016 | Laing | F01K 23/10 |
| 9,638,104 B2 | 5/2017 | Cho et al. | |

(Continued)

FOREIGN PATENT DOCUMENTS

| CN | 105835706 A | 8/2016 |
|---|---|---|
| CN | 110107366 A | 8/2019 |

(Continued)

OTHER PUBLICATIONS

European Search Report for European Application No. 21165389.4, dated Nov. 12, 2021, 9 pages.

*Primary Examiner* — Todd E Manahan
*Assistant Examiner* — Rodolphe Andre Chabreyrie
(74) *Attorney, Agent, or Firm* — Cantor Colburn LLP (57) ABSTRACT

Waste heat management systems are described. The waste heat management systems include a turbine engine having a compressor section, a combustor section, a turbine section, and a nozzle. The compressor section, the combustor section, the turbine section, and the nozzle define a core flow path that expels through the nozzle. The waste heat management systems also include an auxiliary power unit (APU) system and a waste heat recovery system operably connected to the APU system. The APU system is integrated into a working fluid flow path of the waste heat recovery system.

19 Claims, 4 Drawing Sheets

(56) References Cited

U.S. PATENT DOCUMENTS

| | | | |
|---|---|---|---|
| 9,752,462 B1* | 9/2017 | Fletcher | F02C 1/10 |
| 10,422,252 B2 | 9/2019 | Allam et al. | |
| 2004/0003583 A1* | 1/2004 | Uematsu | F01K 23/106 60/39.182 |
| 2012/0128463 A1* | 5/2012 | Held | F01K 25/103 415/1 |
| 2014/0352317 A1 | 12/2014 | Loebig et al. | |
| 2017/0101931 A1 | 4/2017 | Armstrong et al. | |
| 2018/0141675 A1 | 5/2018 | Halsey et al. | |
| 2019/0072007 A1 | 3/2019 | Sinatov | |
| 2019/0249599 A1 | 8/2019 | Sen et al. | |
| 2020/0002009 A1 | 1/2020 | Quartarone et al. | |

FOREIGN PATENT DOCUMENTS

| | | |
|---|---|---|
| KR | 20160024495 A | 3/2016 |
| KR | 20170114332 A | 10/2017 |
| KR | 20170114333 A | 10/2017 |

* cited by examiner

SUPERCRITICAL CO₂ CYCLE AND INTEGRATED AUXILIARY POWER FOR GAS TURBINE ENGINES

TECHNICAL FIELD

The present disclosure relates generally to systems for recovering waste heat in gas turbine engines, and more specifically to work and/or waste heat recovery systems that utilize a cycle to recover work from excess heat and generate additional power for the aircraft.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some configurations, a fan is also connected to the shaft and is driven to rotate via rotation of the turbine.

The compression process of the gas turbine engine results in a rise in the temperature of the gas at the compressor exit due to increasing pressure and component inefficiencies. At certain elevated pressures, the compressed air may become hotter than desirable for the purposes of turbine cooling and it is desirable to cool the compressed air prior to being used as a cooling fluid within the gas turbine engine. The waste heat that is generated (extracted) from this cooled cooling air is imparted to the exhaust flow and expelled without providing additional work. Waste heat is a source of loss (inefficiency) in a thermodynamic cycle, and reduction of waste heat in an engine therefore increases the efficiency of the engine.

BRIEF SUMMARY

According to some embodiments, waste heat management systems are provided. The waste heat management systems include a turbine engine having a compressor section, a combustor section, a turbine section, and a nozzle. The compressor section, the combustor section, the turbine section, and the nozzle define a core flow path that expels through the nozzle. The waste heat management system also includes an auxiliary power unit (APU) system and a waste heat recovery system operably connected to the APU system. The APU system is integrated into a working fluid flow path of the waste heat recovery system.

In addition to one or more of the features described above, or as an alternative, further embodiments of the waste heat management systems may include that the APU system is integrated with the turbine engine.

In addition to one or more of the features described above, or as an alternative, further embodiments of the waste heat management systems may include that the APU system is integrated within the turbine engine.

In addition to one or more of the features described above, or as an alternative, further embodiments of the waste heat management systems may include that the waste heat recovery system comprises a heat recovery heat exchanger arranged at the nozzle and a secondary heat recovery heat exchanger arranged as part of the APU system.

In addition to one or more of the features described above, or as an alternative, further embodiments of the waste heat management systems may include a switch valve configured to selectively direct a working fluid to the heat recovery heat exchanger and the secondary heat recovery heat exchanger.

In addition to one or more of the features described above, or as an alternative, further embodiments of the waste heat management systems may include that the working fluid is directed to the heat recovery heat exchanger when the gas turbine engine is in an on state and wherein the working fluid is directed to the secondary heat recovery heat exchanger when the gas turbine engine is in an off state.

In addition to one or more of the features described above, or as an alternative, further embodiments of the waste heat management systems may include that the APU system comprises an APU burner and a secondary heat recovery heat exchanger.

In addition to one or more of the features described above, or as an alternative, further embodiments of the waste heat management systems may include that the waste heat recovery system includes a turbine and wherein the APU system is operably connected to the turbine of the waste heat recovery system.

In addition to one or more of the features described above, or as an alternative, further embodiments of the waste heat management systems may include that the waste heat recovery system includes a turbine and a compressor. The turbine and the compressor of the waste heat recovery system are configured to generate work, wherein the generated work is at least one of mechanical work and electrical power.

In addition to one or more of the features described above, or as an alternative, further embodiments of the waste heat management systems may include a switch valve configured to selectively direct a working fluid through the APU system.

According to some embodiments, waste heat management systems are provided. The waste heat management systems include a cooling duct, a waste heat recovery system having a heat rejection heat exchanger thermally connected to a portion of the cooling duct, the heat rejection heat exchanger being a working fluid-to-air heat exchanger, a recuperating heat exchanger being a working fluid-to-working fluid heat exchanger, a heat recovery heat exchanger being a working fluid-to-exhaust heat exchanger, an auxiliary power unit (APU) system having a secondary heat recovery heat exchanger that is a working fluid-to-APU exhaust heat exchanger, and a working fluid within the waste heat recovery system configured to flow through the recuperating heat exchanger, the heat rejection heat exchanger, and at least one of the heat recovery heat exchanger and the secondary heat recovery heat exchanger.

In addition to one or more of the features described above, or as an alternative, further embodiments of the waste heat management systems may include that the working fluid is supercritical $CO_2$ ($sCO_2$).

In addition to one or more of the features described above, or as an alternative, further embodiments of the waste heat management systems may include that the waste heat recovery system has a turbine and a compressor. The turbine and the compressor of the waste heat recovery system are configured to generate work.

In addition to one or more of the features described above, or as an alternative, further embodiments of the waste heat management systems may include a turbine engine having a compressor section, a combustor section, and a turbine section. The compressor section, the combustor section, the turbine section, and the nozzle define a core flow path that exhausts through the nozzle, and the heat recovery heat exchanger is arranged in the exhaust of the nozzle.

In addition to one or more of the features described above, or as an alternative, further embodiments of the waste heat management systems may include a switch valve configured to selectively direct the working fluid to the heat recovery heat exchanger and the secondary heat recovery heat exchanger.

In addition to one or more of the features described above, or as an alternative, further embodiments of the waste heat management systems may include that the working fluid is directed to the heat recovery heat exchanger when the gas turbine engine is in an on state and wherein the working fluid is directed to the secondary heat recovery heat exchanger when the gas turbine engine is in an off state.

In addition to one or more of the features described above, or as an alternative, further embodiments of the waste heat management systems may include that the APU system comprises an APU burner and a secondary heat recovery heat exchanger.

In addition to one or more of the features described above, or as an alternative, further embodiments of the waste heat management systems may include that the APU system comprises an APU blower arranged between the APU burner and the secondary heat recovery heat exchanger.

In addition to one or more of the features described above, or as an alternative, further embodiments of the waste heat management systems may include that the waste heat recovery system comprises a turbine and wherein the APU system is operably connected to the turbine of the waste heat recovery system.

According to some embodiments, waste heat management systems are provided. The waste heat management systems include a turbine engine having a compressor section, a combustor section, a turbine section, and a nozzle, wherein the compressor section, the combustor section, the turbine section, and the nozzle define a core flow path that expels through the nozzle. The systems further include an auxiliary power unit (APU) system and a means for recovering waste heat operably connected to the APU system, wherein the APU system is integrated into a working fluid flow path of the means for recovering waste heat.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
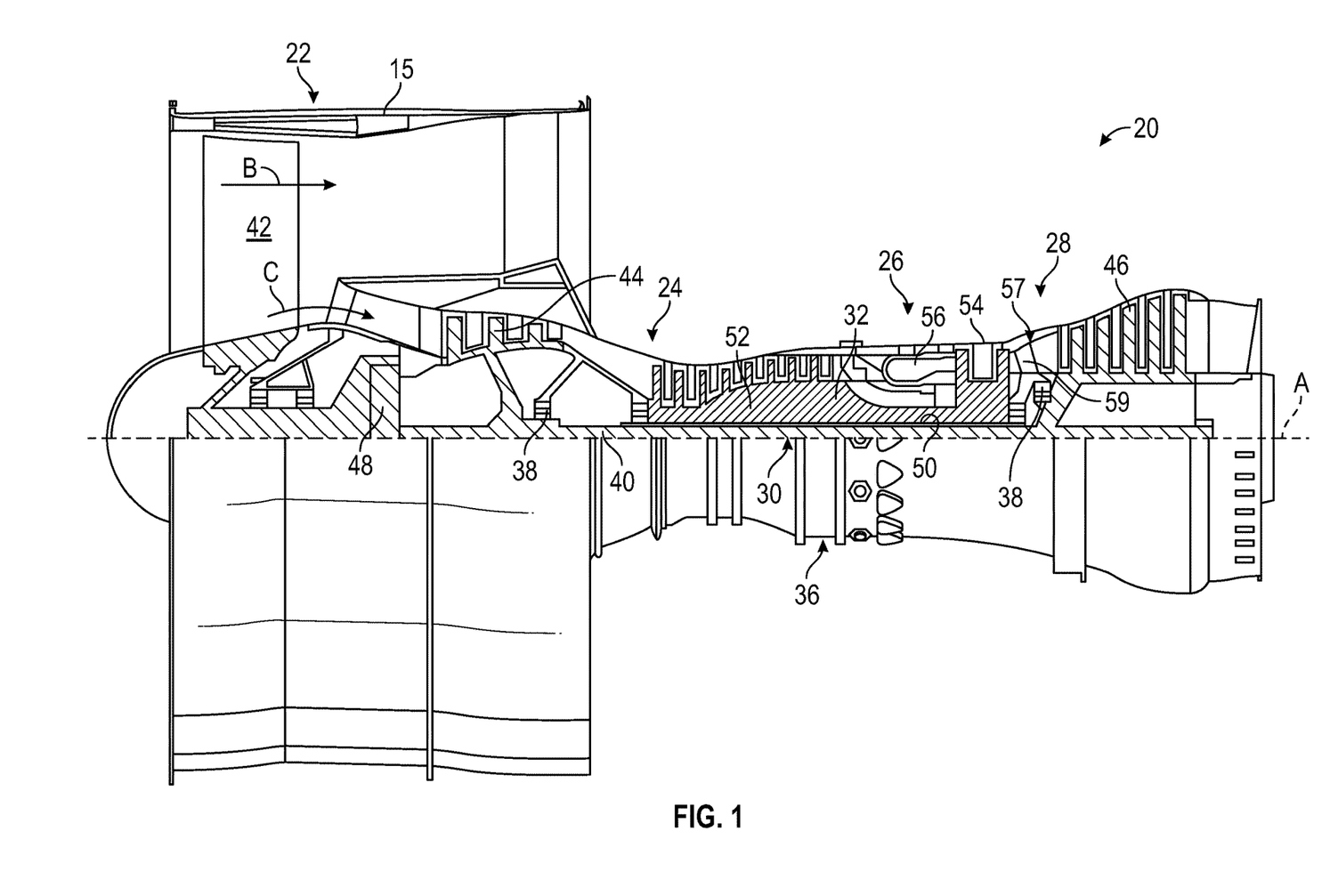
FIG. 1 is a schematic cross-sectional illustration of a gas turbine engine architecture that may employ various embodiments disclosed herein.

FIG. 1 schematically illustrates a gas turbine engine 20. As illustratively shown, the gas turbine engine 20 is configured as a two-spool turbofan that has a fan section 22, a compressor section 24, a combustor section 26, and a turbine section 28. The illustrative gas turbine engine 20 is merely for example and discussion purposes, and those of skill in the art will appreciate that alternative configurations of gas turbine engines may employ embodiments of the present disclosure. The fan section 22 includes a fan 42 that is configured to drive air along a bypass flow path B in a bypass duct defined within a nacelle 15. The fan 42 is also configured to drive air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

In this two-spool configuration, the gas turbine engine 20 includes a low speed spool 30 and a high speed spool 32 mounted for rotation about an engine central longitudinal axis A relative to an engine static structure 36 via one or more bearing systems 38. It should be understood that various bearing systems 38 at various locations may be provided, and the location of bearing systems 38 may be varied as appropriate to a particular application and/or engine configuration.

The low speed spool 30 includes an inner shaft 40 that interconnects the fan 42 of the fan section 22, a first (or low) pressure compressor 44, and a first (or low) pressure turbine 46. The inner shaft 40 is connected to the fan 42 through a speed change mechanism, which, in this illustrative gas turbine engine 20, is as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the combustor section 26 between the high pressure compressor 52 and the high pressure turbine 54. A mid-turbine frame 57 of the engine static structure 36 is arranged between the high pressure turbine 54 and the low pressure turbine 46. The mid-turbine frame 57 may be configured to support one or more of the bearing systems 38 in the turbine section 28. The inner shaft 40 and the outer shaft 50 are concentric and rotate via the bearing systems 38 about the engine central longitudinal axis A which is collinear with their longitudinal axes.

The core airflow through core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 (e.g., vanes) which are arranged in the core airflow path C. The turbines 46, 54 rotationally drive the respective low speed spool 30 and high speed spool 32 in response to the expansion of the core airflow. It will be appreciated that each of the positions of the fan section 22, the compressor section 24, the combustor section 26, the turbine section 28, and geared architecture 48 or other fan drive gear system may be varied. For example, in some embodiments, the geared architecture 48 may be located aft of the combustor section 26 or even aft of the turbine section 28, and the fan section 22 may be positioned forward or aft of the location of the geared architecture 48.

The gas turbine engine 20 in one example is a high-bypass geared aircraft engine. In some such examples, the engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3 and the low pressure turbine 46 has a pressure ratio that is greater than about five (5). In one non-limiting embodiment, the bypass ratio of the gas turbine engine 20 is greater than about ten (10:1), a diameter of the fan 42 is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. In some embodiments, the geared architecture 48 may be an epicycle gear train, such as a planetary gear system or other gear system, with a gear reduction ratio of greater than about 2.3:1. It should be understood, however, that the above parameters are only for example and explanatory of one non-limiting embodiment of a geared architecture engine and that the present disclosure is applicable to other gas turbine engines including turbojets or direct drive turbofans or turboshafts.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Gas turbine engines generate substantial amounts of heat that is exhausted from the turbine section 28 into a surrounding atmosphere. This expelled exhaust heat represents wasted energy, and can be a large source of inefficiency in gas turbine engines.

Figure 2:
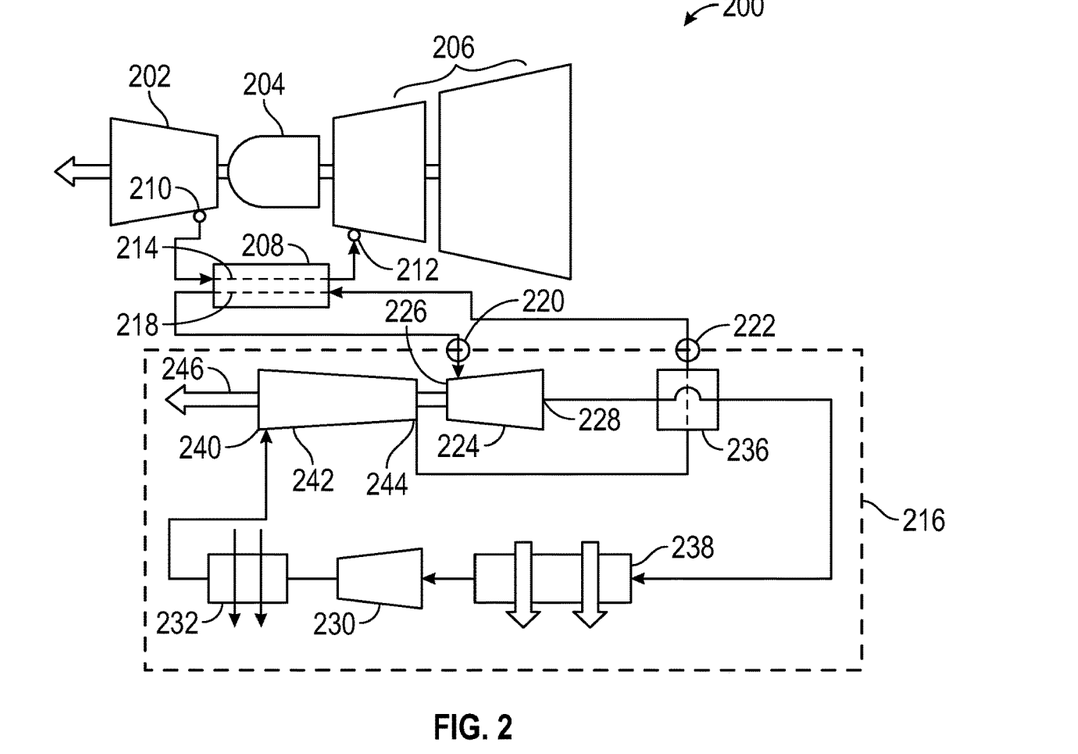
FIG. 2 is a schematic illustration of a gas turbine engine including a cooled cooling air driven overexpanding, recuperating supercritical $CO_2$ cycle that may incorporate embodiments of the present disclosure.

Turning now to FIG. 2, a schematic illustration of a gas turbine engine 200, including a compressor section 202, a combustor section 204, and a turbine section 206, all of which are connected via a primary fluid flow path, is shown. The gas turbine engine 200 may have, for example, a similar structure and configuration as that shown and described with respect to FIG. 1, although such structure is not to be limiting and such systems will include, at least, various additional components as described herein. The turbine cooling air is employed to provide cooling to the turbines and other components of the gas turbine engine 200.

To capture the waste heat within the gas turbine engine 200 and convert such waste heat to work, a waste heat recovery heat exchanger 208 is connected to a compressor bleed port 210 and a turbine inlet 212. The waste heat recovery heat exchanger 208 provides a hot flow path 214 that connects the compressor bleed port 210 to the turbine inlet 212. As such, the hot flow path 214 bypasses the combustor section 204. In one non-limiting example, the compressor bleed port 210 is located at or downstream of an aft most compressor stage of the compressor section 202. Further, in some embodiments, the turbine inlet 212 is arranged at or upstream of the upstream-most turbine stage of the turbine section 206.

As the air from the compressor bleed port 210 is passed through the waste heat recovery heat exchanger 208, a portion of the heat in the bypassed air may be extracted at the waste heat recovery heat exchanger 208. The heat extracted from the hot flow path 214 provides the air at the turbine inlet 212 to be at an appropriate pressure and temperature to be used to cool portions of the turbine section 206. The waste heat recovery heat exchanger 208 extracts heat from the air bled from the compressor section 202 and provides the extracted heat to a waste heat recovery system 216. The waste heat recovery system 216 is configured to use the waste heat to generate work and provide the generated work to one or more engine systems within the gas turbine engine 200. The waste heat recovery heat exchanger 208 includes the hot flow path 214 (may be a first fluid path) that connects the compressor bleed port 210 to the turbine inlet 212, and a cold flow path 218 (may be a second fluid path) that connects an inlet 220 of the waste heat recovery system 216 and an outlet 222 of the waste heat recovery system 216.

Within the waste heat recovery heat exchanger 208, heat is transferred from air within the hot flow path 214 to working fluid within the cold flow path 218. The cold flow path 218 is connected to the waste heat recovery system 216. In some embodiments, the waste heat recovery system 216 is configured as a supercritical $CO_2$ ($sCO_2$) Brayton cycle. The waste heat recovery system 216 converts the extracted heat into work (e.g., rotational work and/or electrical) which is provided to at least one additional engine system of the gas turbine engine 200. The waste heat recovery system 216 includes a working fluid (e.g., $sCO_2$) that is retained and used within a closed-loop system (e.g., within the waste heat recovery system 216). The waste heat recovery system 216 recuperates waste heat and expands the $sCO_2$ working fluid below the supercritical pressure during a working cycle. Such expansion of the $sCO_2$ is referred to as an overexpanded recuperating work recovery cycle.

In the illustrative configuration, included within the waste heat recovery system 216 is a turbine 224 with an inlet 226 connected to an output of the waste heat recovery heat exchanger 208. The turbine 224 is configured to expand the heated working fluid and expels the heated working fluid through a turbine outlet 228. The turbine 224 may be configured to expand the working fluid beyond an expansion that would place the working fluid back at, or just above, the supercritical point prior to a beginning of a working fluid cycle. This expansion may be referred to as overexpansion. As a result of the overexpansion, a secondary compressor 230 and a second heat rejection heat exchanger 232 are, optionally, included within the working cycle of the waste heat recovery system 216 to return the working fluid (sCO$_2$) to a pressure and temperature required to achieve a supercritical state at the beginning of a working cycle.

From the turbine 224, the expelled working fluid is passed through a relatively hot passage of a recuperating heat exchanger 236. The working fluid is then passed to a relatively hot passage of a first heat rejection heat exchanger 238. After passing through the first heat rejection heat exchanger 238, the working fluid is passed to the secondary compressor 230 and the second heat rejection heat exchanger 232. The working fluid is then passed to an inlet 240 of a compressor 242 (alternately referred to as a working fluid compressor 242). The compressor 242 is configured to compress the working fluid and direct the compressed working fluid from a compressor outlet 244 to a cold passage of the recuperating heat exchanger 236. In practical terms, the location of the inlet 240 of the working fluid compressor 242 is referred to as the start of the working fluid cycle.

During operation of the waste heat recovery system 216, the compressor 242 compresses the working fluid, and passes the compressed working fluid through the recuperating heat exchanger 236 and the waste heat recovery heat exchanger 208, causing the compressed working fluid to be heated. The heated working fluid is provided to the inlet 226 of the turbine 224 and expanded through the turbine 224, driving the turbine 224 to rotate. As described above, the turbine 224 is configured to overexpand the working fluid beyond a point that would return the working fluid to the state of the working fluid at the beginning of the cycle. The rotation of the turbine 224 drives rotation of the compressor 242, the overexpansion compressor 230, and an output shaft 246. The output shaft 246 is mechanically connected or coupled to one or more additional turbine engine systems. The coupling of the output shaft 246 provides work to the connected systems using any conventional means for transmitting rotational work. Additionally, in some embodiments and configurations, the rotational work can be converted into electricity and used to power one or more engine or aircraft systems. By way of example, transmitting rotational work can include a drive shaft, a gear system, an electrical generator and distribution system, or any similar structure(s). In the illustrated example, the working fluid is a CO$_2$ fluid that is maintained at or above a supercritical point throughout the entirety of the working cycle. Due to being maintained at or above the supercritical vapor dome, the waste heat recovery system 216 may be referred to as a supercritical CO$_2$ cycle (sCO$_2$ cycle).

Figure 3:
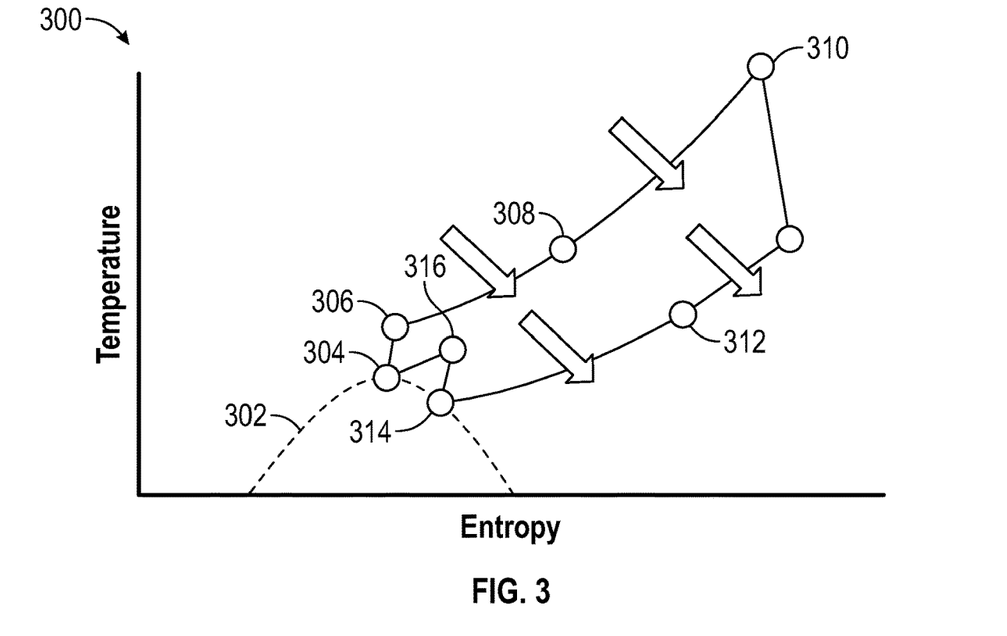
FIG. 3 illustrates a recuperating supercritical $CO_2$ cycle diagram.

Referring now to FIG. 3, a chart 300 illustratively shows a state of a working fluid throughout a working cycle of a waste heat recovery system in accordance with an embodiment of the present disclosure. For example, chart 300 may represent a state plot of a working fluid within the waste heat recovery system 216 shown in FIG. 2. The chart 300 illustrates the relationship of temperature with respect to entropy of the working fluid. Initially, the working fluid starts at or above a peak of a vapor dome 302 at a starting point 304. The vapor dome 302 represents an upper boundary above which the working fluid is at the corresponding supercritical point. Reference will be made, for explanatory purposes, with respect to the waste heat recovery system 216 shown in FIG. 2. For example, the starting point 304 is the state of the working fluid at, for example, the inlet of the compressor 242, prior to the working fluid undergoing compression by the compressor 242.

As noted, the working fluid is compressed in the compressor 242, causing the temperature and pressure of the working fluid to increase, while also imparting a minimal increase in the entropy of the working fluid until the working fluid is expelled from the compressor 242. Point 306 of the chart 300 represents the state of the working fluid at the compressor outlet 244. After exiting the compressor 242, the working fluid is passed through the recuperating heat exchanger 236, where the temperature and entropy of the working fluid are increased to point 308, at an outlet of the recuperating heat exchanger 236.

The working fluid is then passed from the outlet of the recuperating heat exchanger 236 to the waste heat recovery heat exchanger 208. Within the waste heat recovery heat exchanger 208, the entropy and temperature of the working fluid are increased to a point 310 on chart 300. The point 310 represents the state of the working fluid at the outlet of the waste heat recovery heat exchanger 208 and at the inlet 226 of the turbine 228. Further, the point 310 represents the peak temperature and entropy of the working fluid in the cycle.

As power is extracted from the working fluid in the turbine 224, the temperature and pressure of the working fluid will drop. The pressure is reduced below the level of the start of the cycle (point 304) and needs to be compressed back up to the pressure at the starting point 304. The overexpansion in the turbine 224 allows for additional work extraction compared to expanding to the pressure of the start of the cycle (point 304). After work has been extracted by the turbine 224, the overexpanded working fluid is provided to the recuperating heat exchanger 236 and a portion of the excess heat is transferred from the expanded working fluid to working fluid between points 306 and 308 of the chart 300 (representative of the cycle). The state of the working fluid at the outlet of the recuperating heat exchanger 236 and the inlet of the first heat rejection heat exchanger 238 is illustrated at point 312.

To improve operations of the waste heat recovery system 216, the waste heat recovery system 216 employs the second heat rejection heat exchanger 232 to return the state of the working fluid to as close to the starting point 304 as possible. Due to the overexpansion at the turbine 224, the pressure of the working fluid at an outlet of the heat rejection heat exchanger 238 (point 314) is lower than required to maintain the working fluid at a supercritical point at the start of the working fluid cycle. To address this, the working fluid is pressurized in the secondary compressor 230. The pressurization results in a pressure and temperature of the working fluid at an outlet (point 316) of the secondary compressor 230 being above that which is required to maintain the supercritical state of the working fluid. The second heat rejection heat exchanger 232 is used to transfer waste heat in a similar manner as the first heat rejection heat exchanger 238, and returns the working fluid to the inlet 240 of the working fluid compressor 242. The waste heat can be transferred into any number of heat sinks within the gas turbine engine including, but not limited to, fan duct air, ram air, fuel, and a transcritical CO$_2$ refrigeration cycle. The multiple stages of compression, with heat rejection in between, creates an intercooled compression that increases the bottoming cycle efficiency.

In the illustrated example presented in chart 300 of FIG. 3, the starting point 304 of the cycle is immediately at the vapor dome 302. In practical examples, the starting point can be targeted at slightly above the vapor dome in order to prevent minor variations during operation and other practical considerations from causing the working fluid to fall below the vapor dome 302.

In certain situations and/or configurations heat exchanger pressure losses and size may be concerns, especially with respect to the first and/or second heat rejection heat exchangers 232, 238 shown in FIG. 2. In some configurations of the waste heat recovery systems described above (e.g., a supercritical $CO_2$ bottoming cycle concept), if the waste heat is transferred into a fan duct or ram air via a heat rejection heat exchanger to return the working fluid to its starting point temperature, then there is a limited pressure drop available for the cold side of the heat exchanger (e.g., second heat rejection heat exchanger 232 shown in FIG. 2). A higher pressure drop would allow for a more compact, lighter weight second heat exchanger. Also, in a low fan pressure ratio stream, air will not naturally enter the second heat exchanger without extensive baffling, which can incur additional pressure losses and weight.

It will be appreciated that the configuration of the above described embodiments is merely for example and explanatory purposes, and other configurations are possible without departing from the scope of the present disclosure. For example, in some configurations, the secondary compressor and/or the second heat rejection heat exchanger, described with respect to FIG. 2, may be optional components in the system (e.g., may be removed or not necessary in certain configurations). The cooler exchanger, in some embodiments, may be arranged within a bypass flow stream that is not part of the hot section of a gas turbine engine. For example, in some embodiments, the cooler exchanger may be arranged within or along the bypass flow path B in a bypass duct, such as shown in FIG. 1. In other embodiments, the cooler heat exchanger may be arranged within an inlet scoop, such as on a turboshaft engine configuration.

It will be appreciated that the different heat exchangers of the systems described herein may have different functions and/or heat exchangers. For example, in some embodiments, the waste heat recovery heat exchanger may be a working fluid-to-air heat exchanger, the recuperating heat exchanger may be a working fluid-to-working fluid heat exchanger, and the heat rejection heat exchanger (e.g., heat rejection heat exchanger 238) may be a working fluid-to-exhaust heat exchanger. In some such embodiments, the heat rejection heat exchanger may be referred to as a waste heat recovery heat exchanger, and may be arranged proximate or near a core nozzle (e.g., downstream from a low pressure turbine of a gas turbine engine).

Figure 4:
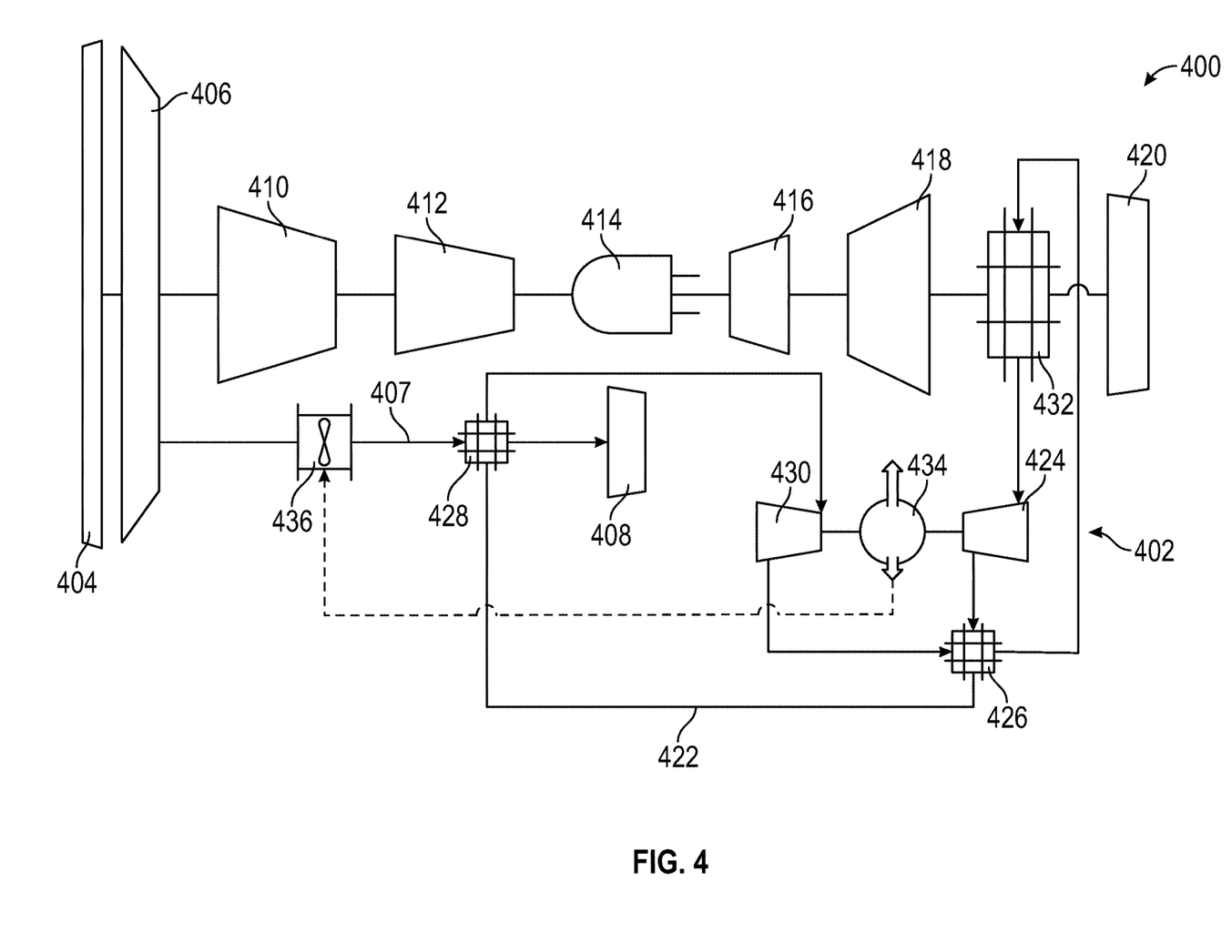
FIG. 4 is a schematic diagram of a gas turbine engine in accordance with an embodiment of the present disclosure.

Turning now to FIG. 4, a schematic diagram of a gas turbine engine 400 in accordance with an embodiment of the present disclosure is shown. The gas turbine engine 400 may be similar to that shown and described above, and may include a waste heat recovery system 402. The gas turbine engine 400 includes an inlet 404, a fan 406 with a fan nozzle 408, a low pressure compressor 410, a high pressure compressor 412, a combustor 414, a high pressure turbine 416, a low pressure turbine 418, and a core nozzle 420 or nozzle section. A bypass flow path may be defined within a bypass duct defined within a nacelle, as described above.

In this configuration, the waste heat recovery system 402 includes a $sCO_2$ flow path 422 that may be a closed-loop system of $CO_2$ that is cycled to extract additional work from waste heat of the gas turbine engine 400, such as described above. The waste heat recovery system 402 includes (in a flow path/cycle direction) a turbine 424, a recuperating heat exchanger 426, a heat rejection heat exchanger 428, a compressor 430, and a heat recovery heat exchanger 432. The turbine 424 is coupled to a power output 434 (e.g., a drive shaft) that can output work. For example, the power output 434 may be connected to a generator (e.g., to generate electricity) or mechanically connected to a fan to drive rotation of the fan (e.g., mechanical work). In some embodiments, the heat recovery heat exchanger 432 is a full annular or circumferential heat exchanger that is arranged between the low pressure turbine 418 and the core nozzle 420, and thus provides a thermal exchanger between a working fluid within the flow path 422 and an exhaust of the gas turbine engine 400. The full annular circumferential heat exchanger may be a circular structure arranged about or within a nozzle of the gas turbine engine, as will be appreciated by those of skill in the art.

The configuration of the gas turbine engine 400, and the waste heat recovery system 402 thereof, modifies the supercritical $CO_2$ bottoming cycle concept. In some supercritical $CO_2$ bottoming cycle concepts, the heat or thermal energy of the working fluid may be transferred into a fan duct or ram air (e.g., cooling duct 407) via the heat rejection heat exchanger 428 to return the working fluid to the starting point temperature. The cooling duct is an airflow path through the gas turbine engine that is separate from a core flow path, and in some embodiments may be completely separate or may be a portion of air extracted from the core flow path. In some such embodiments, (e.g., fan duct location) there may be a limited pressure drop available for the cold side of the heat rejection heat exchanger to provide efficient temperature control of the working fluid (e.g., $CO_2$). In accordance with embodiments of the present disclosure, a sufficient pressure drop is generated at the heat rejection heat exchanger 428. Such increased pressure drop can allow for a more compact, lighter weight heat rejection heat exchanger. Also, in a low fan pressure ratio stream, air will not naturally enter the heat rejection heat exchanger without extensive baffling, which incurs additional pressure loss and/or volume/weight, and embodiments described herein can avoid such baffling within the heat rejection heat exchanger.

In the embodiment of FIG. 4, the heat rejection heat exchanger 428 is arranged within or along a cooling duct 407 defined between the fan 406 and the fan nozzle 408 (e.g., a fan duct). To increase a pressure drop across the heat rejection heat exchanger 428 (on the cold side), an optional blower 436 is arranged upstream of the heat rejection heat exchanger 428. The optional blower 436 may be a fan, turbine, blower, or other air-mover that can generate a pressure drop across the heat rejection heat exchanger 428. The optional blower 436 may be electrically, mechanically, or electromechanically driven. In one non-limiting embodiments, and as shown in FIG. 4, the optional blower 436 may be operably coupled to the power output 434. In one such example, the power output may be an electrical connection, with an electrical generator driven by a rotated shaft driven by the turbine 424. In other embodiments, the power output 434 may be a rotationally driven shaft that drives rotation and operation of the optional blower 436.

Adding a waste heat recovery system, such as a supercritical $CO_2$ bottoming cycle, to the main engine cycle can improve overall system efficiency and reduce fuel burn. However, such added systems can potentially significantly increase the weight onboard an aircraft. Accordingly, the weight of the added components for the waste heat recovery system can limit the achievable improvement. However, by configuring the waste heat recovery system to have additional functionalities can offset such increased weight. For example, an aircraft needs an auxiliary power unit ("APU") to provide power to aircraft systems when the main engines are shut off. The APU also adds weight to the system, reducing some fuel burn performance while the aircraft is in flight. Thus, by combining the functions of the waste heat recovery system and an onboard APU, improved efficiencies may be achieved.

Figure 5:
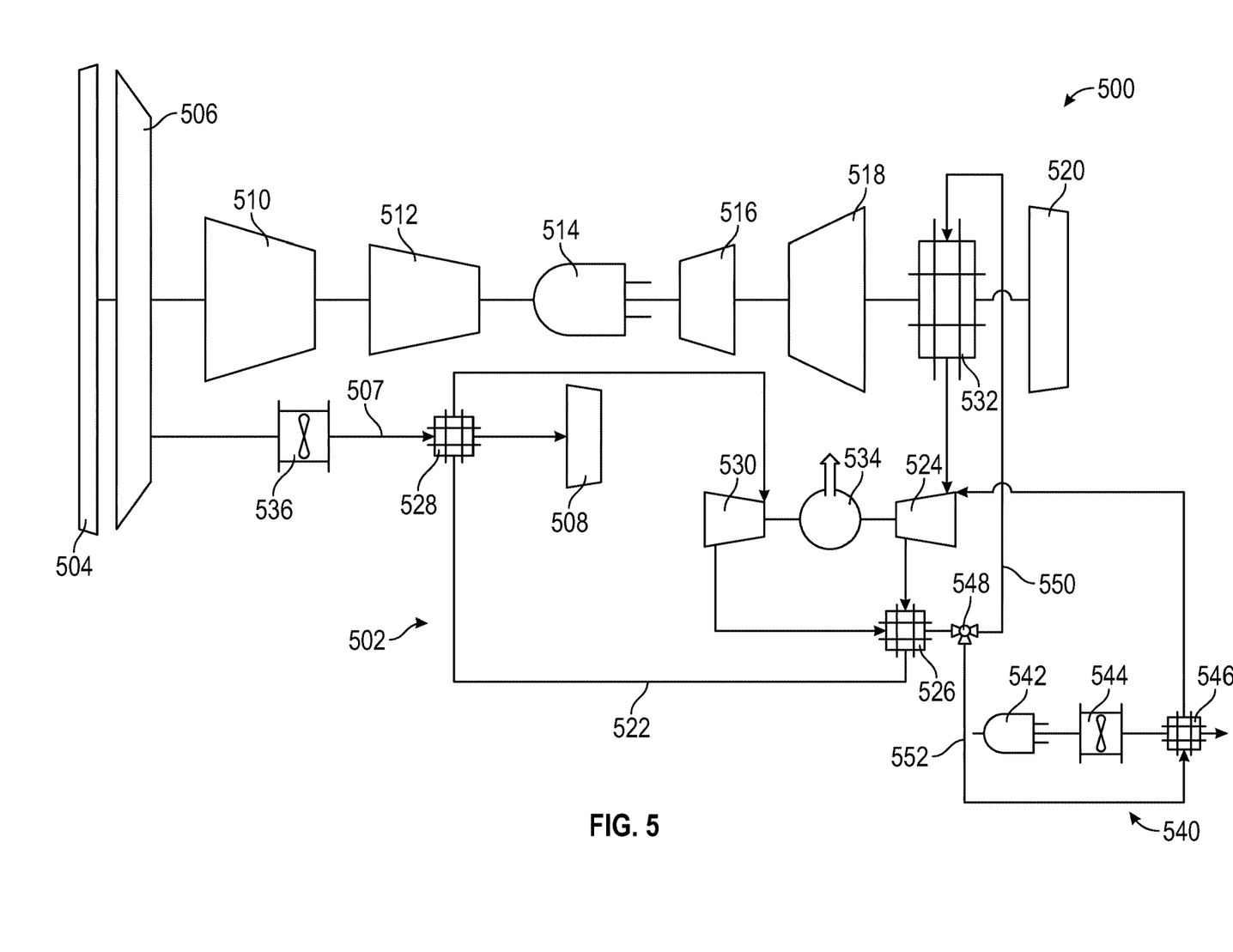
FIG. 5 is a schematic diagram of a gas turbine engine in accordance with an embodiment of the present disclosure.

Turning now to FIG. 5, a schematic diagram of a gas turbine engine 500 in accordance with an embodiment of the present disclosure is shown. The gas turbine engine 500 may be similar to that shown and described above, and may include a waste heat recovery system 502. The gas turbine engine 500 includes an inlet 504, a fan 506 with a fan nozzle 508, a low pressure compressor 510, a high pressure compressor 512, a combustor 514, a high pressure turbine 516, a low pressure turbine 518, and a core nozzle 520. A bypass flow path may be defined within a bypass duct defined within a nacelle, as described above.

In this configuration, the waste heat recovery system 502 includes a working fluid flow path 522 (e.g., $sCO_2$ flow path) that may be a closed-loop system of $CO_2$ that is cycled to extract additional work from waste heat of the gas turbine engine 500, such as described above. The waste heat recovery system 502 includes (in a flow path/cycle direction) a turbine 524, a recuperating heat exchanger 526, a heat rejection heat exchanger 528, a compressor 530, and a heat recovery heat exchanger 532. The turbine 524 is coupled to a power output 534 (e.g., a drive shaft) that can output work. For example, the power output 534 may be connected to a generator (e.g., to generate electricity) or mechanically connected to a fan to drive rotation of the fan (e.g., mechanical work). In some embodiments, the heat recovery heat exchanger 532 is a full annular or circumferential heat exchanger that is arranged between the low pressure turbine 518 and the core nozzle 520. In other embodiments, the heat recovery heat exchanger 532 may be less than a full annular or circumferential heat exchanger, with one or more sections of heat exchanger disposed at various locations at the outlet of the gas turbine engine 500. The heat recovery heat exchanger 532 is configured to provide a thermal exchange between a working fluid within the working fluid flow path 522 and an exhaust of the gas turbine engine 500.

In the waste heat recovery system 502 of FIG. 5, the heat or thermal energy of the working fluid may be transferred into a fan duct or ram air (e.g., a cooling duct 507) via the heat rejection heat exchanger 528 to return the working fluid to the starting point temperature. The cooling duct 507 is an airflow path through the gas turbine engine that is separate from a core flow path, and in some embodiments may be completely separate or may be a portion of air extracted from the core flow path. In some such embodiments, (e.g., fan duct location) there may be a limited pressure drop available for the cold side of the heat rejection heat exchanger to provide efficient temperature control of the working fluid (e.g., $CO_2$). In accordance with embodiments of the present disclosure, a sufficient pressure drop may be generated at or for the heat rejection heat exchanger 528. Such increased pressure drop can allow for a more compact, lighter weight heat rejection heat exchanger. Also, in a low fan pressure ratio stream, air will not naturally enter the heat rejection heat exchanger without extensive baffling, which incurs additional pressure loss and/or volume/weight, and inclusion of a blower 536 can avoid such baffling within the heat rejection heat exchanger.

In the embodiment of FIG. 5, the heat rejection heat exchanger 528 is arranged within or along the cooling duct 507 defined between the fan 506 and the fan nozzle 508 (e.g., a fan duct). To increase a pressure drop across the heat rejection heat exchanger 528 (on the cold side), an optional blower 536 is arranged within the cooling duct 507, illustratively shown upstream from the heat rejection heat exchanger 528, but may be arranged downstream in some embodiment. The optional blower 536 may be a fan, turbine, blower, or other air-mover that can generate a pressure drop across the heat rejection heat exchanger 528. The optional blower 536 may be electrically, mechanically, or electromechanically driven. In one non-limiting embodiment, the optional blower 536 may be operably coupled to the power output 534. In one such example, the power output may be an electrical connection, with an electrical generator driven by a rotated shaft driven by the turbine 524. In other embodiments, the power output 534 may be a rotationally driven shaft that drives rotation and operation of the optional blower 536.

In this embodiment, the gas turbine engine 500 further includes an integrated APU system 540 that is operably connected to the waste heat recovery system 502. The integrated APU system 540 includes an APU burner 542, an optional APU blower 544, and a secondary heat recovery heat exchanger 546. The secondary heat recovery heat exchanger 546 may be a working fluid-to-APU exhaust heat exchanger. The integrated APU system 540, as illustratively shown in the embodiment of FIG. 5, adds a secondary burner (APU burner 542) with a powered fan (APU blower 544), and a secondary $CO_2$ heater heat exchanger (secondary heat recovery heat exchanger 546), to the waste heat recovery system 502 of the gas turbine engine 500.

The integrated APU system 540 is configured to supply additional heat to the working fluid (e.g., $CO_2$) of the waste heat recovery system 502. For example, when an aircraft is located on the ground, and the main engines (e.g., gas turbine engine 500) is off, it may not be possible to add additional heat to the working fluid. However, in the present configuration, by having a flow line of the working fluid pass through the secondary heat recovery heat exchanger 546, additional heat can be applied to the working fluid prior to being directed into the turbine 524 to generate work.

The integrated APU system 540 is configured to generate extra or auxiliary power on an aircraft. The power generated by the integrated APU system 540 may be achieved by passing a hot gas from the APU burner 542 into the secondary heat recovery heat exchanger 546. The hot combusted gas may pass through the secondary heat recovery heat exchanger 546 to enable thermal transfer into the working fluid of the waste heat recovery system 502. Because the integrated APU system 540 can be operated even when the main engine (e.g., gas turbine engine 500) is in an off state, the waste heat recovery system 502 may be continuously operated to generate work through the power output 534. Specifically, the integrated APU system 540 enables the waste heat recovery system 502 to become an auxiliary power unit or system of the aircraft, thus potentially eliminating (or shrinking) other APU systems on the aircraft, resulting in weight savings and other benefits.

As shown, the integrated APU system 540 may be selectively connected to the waste heat recovery system 502 by a switch valve 548. The switch valve 548 splits the working fluid flow path 522 into a main engine flow path 550 and an APU flow path 552. When the gas turbine engine 500 is in operation, the switch valve 548 is controlled to direct all or most of the working fluid along the main engine flow path 550. However, when the gas turbine engine 500 is off, the switch valve 548 may be controlled to direct all or most of the working fluid along the APU flow path 552. When the working fluid passes through the main engine flow path 550, the working fluid will pick up heat within the heat recovery heat exchanger 532 at the outlet/nozzle of the gas turbine engine 500. When the working fluid passes through the APU flow path 552, the working fluid will pick up heat within the secondary heat recovery heat exchanger 546 of the integrated APU system 540. In either case, after passing through the heat recovery heat exchanger 532 or the secondary heat recovery heat exchanger 546, the heated working fluid will be directed into the turbine 524 to generate work onboard an aircraft.

The switch valve 548 may include a fluid and/or pressure regulator that enables selective flow control through one or both the main engine flow path 550 and the APU flow path 552. When the waste heat recovery system 502 is operated using the APU system 540, the waste heat recovery system 502 becomes an APU for the aircraft. In some embodiments, the waste heat recovery system 502 with the integrated APU system 540 may be the sole APU of an aircraft. In other embodiments, the integrated APU system 540 may be a supplemental or additional APU system that allows the reduction of other APU systems on the aircraft. Further, in some embodiments, each engine on an aircraft can include an integrated APU system as described herein, enabling multiple APU systems to be operationally functional on an aircraft. In other configurations, the waste heat recovery system may be integrated into a traditional APU system, with the APU system having an associated turbine and compressor. It will be appreciated that such systems may have more components than that shown in FIG. 5, but is a viable configuration, as will be appreciated by those of skill in the art.

In some embodiments, the switch valve 548 may be a split valve that directs 100% of the working fluid into the main engine flow path 550 or the APU flow path 552. In other embodiments, the switch valve 548 may be arranged to provide a gradual transition from one flow path to the other, such that, at times, a portion of the working fluid may flow through both the main engine flow path 550 and the APU flow path 552 simultaneously.

In accordance with embodiments of the present disclosure, and as described above, one or more powered blowers may be added to the waste heat recovery system and integrated APU system. In some embodiments, a powered blower can be arranged in a fan duct, either upstream or downstream of a $sCO_2$ heat rejection heat exchanger. In some embodiments, a powered blower may be arranged to direct heated air from an APU burner through a secondary heat recovery heat exchanger of an integrated APU system. In some configurations, such as an operation with the main engine in an off state, a blower can be employed to generate a pressure drop or delta pressure across the heat rejection heat exchanger The powered blowers may be electrically powered, using power extracted from power generated by the waste heat recovery system (e.g., from the turbine of the waste heat recovery system) and/or from the integrated APU system. In accordance with embodiments of the present disclosure, a portion of the work generated by the waste heat recovery system is used to power and draw air into the heat rejection heat exchanger to allow the needed heat transfer to occur, without the use of baffles.

Advantageously, embodiments of the present disclosure provide for a waste heat recovery system that can generate additional work or power onboard an aircraft, even when the main engine is off. As such, the waste heat recovery system may have a dual-use, for when the main gas turbine engine is on and off. This dual-use configuration can reduce an overall weight for an aircraft that has both an APU to power subsystems while the main engines are off, and a waste heat recovery system for the gas turbine engines to improve engine thermal efficiency while the main engines are on. Combining the two systems reduces the total number of components and weight required, resulting in an overall aircraft fuel burn reduction.

While described above in conjunction with a geared turbofan engine, it is appreciated that the waste heat recovery systems described herein can be utilized in conjunction with any type of turbine engine including a cooled cooling air system with only minor modifications that are achievable by one of skill in the art. The cooled cooling air systems described herein provide a main engine architecture that drives to high pressures by reducing the temperature of the turbine cooling air. Further, the systems described herein provide for recovery of some work from the cooled cooling air system that is normally transferred into a heat sink. Additionally, the mass flow of the $CO_2$ in the system described above, and therefore all the component volumes, may be sized specifically to provide a desired amount of cooling necessary to reduce the temperature of the turbine cooling air. For example, in some configurations and embodiments, the bleed turbine air will be on the order of 5% of core flow. A further benefit of the waste heat recovery systems described herein is that due to the high density and heat capacity of supercritical $CO_2$, a higher level of compaction can be achieved relative to comparable air systems for cooled cooling air. This is significant for weight and engine integration.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A waste heat management system comprising:
   a turbine engine including:
      a compressor section;
      a combustor section;

a turbine section; and
a nozzle, wherein the compressor section, the combustor section, the turbine section, and the nozzle define a core flow path that expels through the nozzle;
a fan configured to direct air into the core flow path and direct air as a bypass flow through a fan duct separate from the core flow path;
an auxiliary power unit (APU) system;
a waste heat recovery system operably connected to both the turbine engine and the APU system, wherein the APU system is integrated into a working fluid flow path of the waste heat recovery system, wherein the waste heat recovery system comprises a recuperating heat exchanger, a heat recovery heat exchanger arranged at the nozzle, a secondary heat recovery heat exchanger arranged as part of the APU system, and a heat rejection heat exchanger arranged in the bypass flow, wherein the recuperating heat exchanger is a working fluid-to-working fluid heat exchanger arranged downstream from the heat rejection heat exchanger along the working fluid flow path, the heat recovery heat exchanger is a working fluid-to-exhaust heat exchanger arranged downstream from the recuperating heat exchanger along the working fluid flow path, and the secondary heat recovery heat exchanger is arranged downstream from the recuperating heat exchanger along the working fluid flow path; and
a valve configured to selectively direct a working fluid to the heat recovery heat exchanger and the secondary heat recovery heat exchanger, wherein the working fluid flow path, in a flow direction, passes through the heat rejection heat exchanger to the valve and wherein the valve is configured to direct the working fluid to the secondary heat recovery heat exchanger when the gas turbine engine is in an off state.

2. The waste heat management system of claim 1, wherein the APU system is integrated with the turbine engine.

3. The waste heat management system of claim 1, wherein the APU system is integrated within the waste heat recovery system.

4. The waste heat management system of claim 1, wherein the APU system comprises an APU burner.

5. The waste heat management system of claim 1, wherein the waste heat recovery system comprises a turbine and wherein the APU system is operably connected to the turbine of the waste heat recovery system.

6. The waste heat management system of claim 1, wherein the waste heat recovery system further comprises:
a turbine; and
a compressor,
wherein the turbine and the compressor of the waste heat recovery system are configured to generate work, wherein the generated work is at least one of mechanical work and electrical power when the engine is in both an on state and the off state.

7. The waste heat management system of claim 1, wherein the working fluid is supercritical $CO_2$ ($sCO_2$).

8. A waste heat management system comprising:
a gas turbine engine having a fan configured to direct air through a cooling duct;
a waste heat recovery system having a working fluid passing along a working fluid flow path, the waste heat recovery system comprising:
a heat rejection heat exchanger thermally connected to a portion of the cooling duct, the heat rejection heat exchanger being a working fluid-to-air heat exchanger;
a recuperating heat exchanger being a working fluid-to-working fluid heat exchanger arranged downstream from the heat rejection heat exchanger along the working fluid flow path;
a heat recovery heat exchanger being a working fluid-to-exhaust heat exchanger arranged downstream from the recuperating heat exchanger along the working fluid flow path;
an auxiliary power unit (APU) system having a secondary heat recovery heat exchanger that is a working fluid-to-APU exhaust heat exchanger, wherein the secondary heat recovery heat exchanger is arranged downstream from the recuperating heat exchanger along the working fluid flow path; and
a valve arranged downstream from the heat rejection heat exchanger along the working fluid flow path and configured to selectively direct the working fluid to the heat recovery heat exchanger and the secondary heat recovery heat exchanger, wherein the valve is configured to direct the working fluid to the secondary heat recovery heat exchanger when the gas turbine engine is in an off state.

9. The waste heat management system of claim 8, wherein the working fluid is supercritical $CO_2$ ($sCO_2$).

10. The waste heat management system of claim 8, wherein the waste heat recovery system further comprises:
a turbine; and
a compressor,
wherein the turbine and the compressor of the waste heat recovery system are configured to generate work when the engine is in both an on state and the off state.

11. The waste heat management system of claim 8, wherein the gas turbine engine comprises:
a compressor section;
a combustor section; and
a turbine section,
wherein the fan, the compressor section, the combustor section, the turbine section, and a nozzle define a core flow path that exhausts through the nozzle, wherein the cooling duct is separate from the core flow path, and wherein the heat recovery heat exchanger is arranged in the exhaust of the nozzle.

12. The waste heat management system of claim 8, wherein the APU system comprises an APU burner.

13. The waste heat management system of claim 12, wherein the APU system comprises an APU blower arranged between the APU burner and the secondary heat recovery heat exchanger.

14. The waste heat management system of claim 8, wherein the waste heat recovery system comprises a turbine and wherein the APU system is operably connected to the turbine of the waste heat recovery system.

15. A waste heat management system comprising:
a turbine engine including:
a fan;
a compressor section;
a combustor section;
a turbine section; and
a nozzle, wherein the fan, the compressor section, the combustor section, the turbine section, and the nozzle define a core flow path that expels through the nozzle, and wherein the fan directs air through a cooling duct that is separate from the core flow path;
an auxiliary power unit (APU) system;
a means for recovering waste heat operably connected to the APU system, wherein the APU system is integrated into a working fluid flow path of the means for recovering waste heat, wherein the working fluid flow path passes through a heat rejection heat exchanger coupled to the cooling duct and a recuperating heat exchanger; and
a valve arranged downstream from the heat rejection heat exchanger and configured to selectively direct a working fluid in the working fluid flow path to a heat recovery heat exchanger arranged at the nozzle and a secondary heat recovery heat exchanger that is part of the APU system, wherein the valve is configured to direct the working fluid to the secondary heat recovery heat exchanger when the gas turbine engine is in an off state,
wherein the recuperating heat exchanger is a working fluid-to-working fluid heat exchanger arranged downstream from the heat rejection heat exchanger along the working fluid flow path, the heat recovery heat exchanger is a working fluid-to-exhaust heat exchanger arranged downstream from the recuperating heat exchanger along the working fluid flow path, and the secondary heat recovery heat exchanger is arranged downstream from the recuperating heat exchanger along the working fluid flow path.

16. The waste heat management system of claim 15, wherein the means for recovering waste heat includes:
a turbine; and
a compressor,
wherein the turbine and the compressor of the waste heat recovery system are configured to generate work when the turbine engine is in both an on state and the off state.

17. The waste heat management system of claim 15, wherein the APU system comprises an APU burner.

18. The waste heat management system of claim 17, wherein the APU system comprises an APU blower arranged between the APU burner and the secondary heat recovery heat exchanger.

19. The waste heat management system of claim 15, wherein the working fluid is supercritical $CO_2$ ($sCO_2$).

\* \* \* \* \*